United States Patent
Chapet et al.

(10) Patent No.: US 8,336,881 B2
(45) Date of Patent: Dec. 25, 2012

(54) METHOD OF PRODUCING A GAMING CHIP, AND A GAMING CHIP COMPRISING TWO PLAQUES

(75) Inventors: Pierre Chapet, Beaune (FR); Christian Leveque, Nuits St Georges (FR); Herve Dotto, Montagny les Beaune (FR)

(73) Assignee: Gaming Partners International, Paris ( * ) Notice: Subject to any disclaimer, the term of this patent is extended or adjusted under 35 U.S.C. 154(b) by 0 days.

(21) Appl. No.: 12/401,593

(22) Filed: Mar. 10, 2009

(65) Prior Publication Data

US 2010/0207326 A1   Aug. 19, 2010

(30) Foreign Application Priority Data

Feb. 16, 2009  (FR) ...................................... 09 50998

(51) Int. Cl.
  *A63F 3/00* (2006.01)
(52) U.S. Cl. .................................... 273/288; 273/148 R
(58) Field of Classification Search .................. 273/288, 273/148 R; 40/27.5; 428/66.5, 67; 425/518, 425/523, 524
  See application file for complete search history.

(56) References Cited

U.S. PATENT DOCUMENTS

| | | | | |
|---|---|---|---|---|
| 3,938,775 A | * | 2/1976 | Sarofeen | 249/102 |
| 3,968,582 A | * | 7/1976 | Jones | 40/27.5 |
| 4,178,277 A | * | 12/1979 | Gebauer et al. | 523/219 |
| 4,435,911 A | * | 3/1984 | Jones | 40/27.5 |
| 5,166,502 A | * | 11/1992 | Rendleman et al. | 235/492 |
| 5,662,839 A | * | 9/1997 | Magne | 264/1.38 |
| 5,895,321 A | * | 4/1999 | Gassies et al. | 463/29 |
| 5,955,207 A | * | 9/1999 | Lederich et al. | 428/660 |
| 2009/0117366 A1 | * | 5/2009 | Honma | 428/314.8 |

* cited by examiner

*Primary Examiner* — Vishu K. Mendiratta (74) *Attorney, Agent, or Firm* — Gordon Silver Ltd; Ronald C. Gorsché

(57) ABSTRACT

A method of producing a gaming chip comprising at least two plaques forming the opposite faces thereof, the method comprising a step of connecting said two plaques placed against one another by arranging therebetween a connection material. The method comprises (i) a step of arranging in a mold two blanks of said two plaques which are placed against one another with the faces thereof facing one another, the total thickness thereof being smaller than that of the finished chip, the mold having an impression with a shape complementary to that of the chip to be produced, (ii) a step of holding the periphery of the plaque blanks within the mold, and (iii) a step of injecting connection material under pressure between facing faces of the two plaque blanks at a pressure and temperature suitable for deforming the plaque blanks against the surface of the impression of the mold.

15 Claims, 5 Drawing Sheets

METHOD OF PRODUCING A GAMING CHIP, AND A GAMING CHIP COMPRISING TWO PLAQUES

CROSS-REFERENCE TO RELATED APPLICATIONS

This application claims priority under 35 USC §119 of French Application No. 0950998 filed on Feb. 16, 2009, the entire disclosure of which is expressly incorporated herein by reference.

FIELD OF THE INVENTION

The present invention relates to a method of producing a gaming chip comprising at least two plaques which form the opposite faces thereof, said method comprising a step of connecting said two plaques which are placed against one another by arranging therebetween a connection material.

The term "chip" is to be understood as a chip with a circular contour in a plan view, a chip with a substantially rectangular contour, both termed "gaming plaques", or a chip with a contour of a different shape.

The present invention also relates to a gaming chip obtained by the method according to the invention.

BACKGROUND OF THE INVENTION

Document FR 2 767 656 discloses a gaming chip in the form of a plaque, the body of which is obtained by cutting it in one piece from a planar sandwich construction formed from a stack of laminated or welded plastics material layers or sheets and has at least two layers which are provided with decoration over the faces thereof.

After the body has been cut out, the final shape of the chip is obtained by a thermoforming process which allows raised portions to be formed on the surface of the chip and, more generally, enables a satisfactory surface finish for the chip to be achieved, i.e. a surface finish of which the appearance and feel are such that they may be handled and stacked easily by croupiers.

It should be noted that the surface finish of the chip may also be a means for verifying the authenticity of the chip by a croupier who is used to handling these chips.

Obtaining a satisfactory surface finish for the chip is thus an important aspect in gaming chip production.

The production process disclosed in patent application FR 2 767 656 is long and costly since it is necessary for some operations to be carried out manually and it involves a number of steps including steps of cutting and thermoforming the chip to obtain a satisfactory general surface finish.

Document WO 2008/058322 describes a method of producing a chip comprising two plaques which are connected back-to-back.

According to the method described in this document, the two plaques are produced separately in a first step in the form of a transparent resin element, the rear face of which is covered with a decorative film fixed by an adhesive. The two stacks or plaques are thermoformed to form two half-shells with a satisfactory surface finish, optionally with raised portions on the outer face thereof, and complementary attachment means at the periphery thereof, except in one region.

In a second step, the two half-shells are laid one on top of the other, with an electronic identification device optionally being provided therebetween, by aligning said half-shells and fitting together the complementary attachment means thereof.

In this way, the two regions not provided with attachment means face one another and form a passage between the two half-shells through which the gap between the two facing faces of the two half-shells is filled with an adhesive material.

In order to obtain a chip with a clean and finished appearance, a final cutting operation is carried out to remove the plaque edges comprising the attachment means and the plaque edge region through which the connection material was injected.

As in the method described in application FR 2 767 656, the method described in application WO 2008/058322 comprises a number of steps, some of which require manual labour.

The object of the invention is to propose a method which is simpler to carry out, comprises fewer production steps, enables the operations requiring manual labour to be reduced as far as possible and enables chips having a surface finish of a better standard than that obtained by the known methods to be achieved.

SUMMARY OF THE INVENTION

The invention relates to a method of the aforementioned type, which is notable in that it comprises the following steps:
  arranging in a mould two blanks of said two plaques which are placed against one another with the faces thereof facing one another, the total thickness of said blanks being smaller than that of the finished chip, said mould having an impression with a shape complementary to that of the chip to be produced,
  holding the periphery of said plaque blanks within said mould,
  injecting said connection material under pressure between said facing faces of said two plaque blanks at a pressure and temperature suitable for deforming said plaque blanks against the surface of the impression of the mould, and
  removing the chip thus obtained from the mould after a predetermined injection time and cooling said chip.

Since the impression of the mould has a shape complementary to that of the chip to be produced, the method according to the invention enables chips, as removed from the mould, having a satisfactory surface finish to be obtained without having to carry out a final cutting step after the injection step.

Moreover, since the step of injecting material under pressure is carried out in a mould which has the final shape of the chip and enables the plaque blanks to be deformed in such a way that the shape thereof substantially follows the entire surface of the impression of the mould, it is thus not necessary to carry out a preliminary step of thermoforming the plaques.

The method, as defined above, thus enables production steps which are indispensable in the methods of the prior art to be dispensed with, and chips of which the surface finish is more precise than that obtained by the methods of the prior art to be obtained. According to the invention, the method may also have the following features, taken in isolation or in combination,
  a detection device is fixed to one of said facing faces of at least one of said two plaque blanks before the step of arranging said blanks in the mould.
  the injection temperature is substantially between 180° C. and 350° C.
  the injection pressure is between 500 and 1,500 bars.
  the two plaque blanks are formed before they are arranged in the mould, the two blanks having substantially planar opposite faces.

The invention also relates to a mould for carrying out the method as defined above, comprising an impression and an injection point, the mould being notable in that it comprises means for holding the mating plane of said plaques in relation to the injection point.

The invention lastly relates to a gaming chip obtained by the method as defined above, comprising two plaques which are laid one on top of the other and are connected by a layer of injected connection material, the chip being notable in that said two plaques each comprise a material capable of deforming during the step of injecting said layer of connection material at said injection temperature and pressure.

According to the invention, the chip may have the following features, taken in isolation or in combination:
- the material comprises cellulose acetate, polyvinyl chloride, methyl polymethacrylate or polycarbonate,
- at least one of the plaques is a laminate of sheets of stacked material,
- the chip comprises at least one detection device embedded in said layer of connection material,
- the detection device is an electronic radio frequency device,
- the detection device is a detection film capable of triggering an alarm when located in a magnetic field.

BRIEF DESCRIPTION OF THE DRAWINGS

A clearer understanding of the invention will be facilitated by the examples which will now be described with reference to the appended figures, in which.

DETAILED DESCRIPTION OF THE PREFERRED EMBODIMENT

Figure 1:
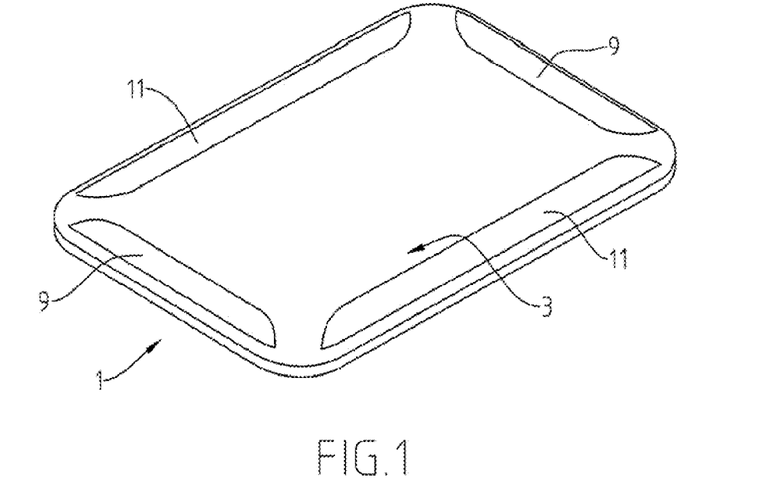
FIG. 1 is a perspective view of a chip obtained in accordance with the method according to the invention.
Figure 2:
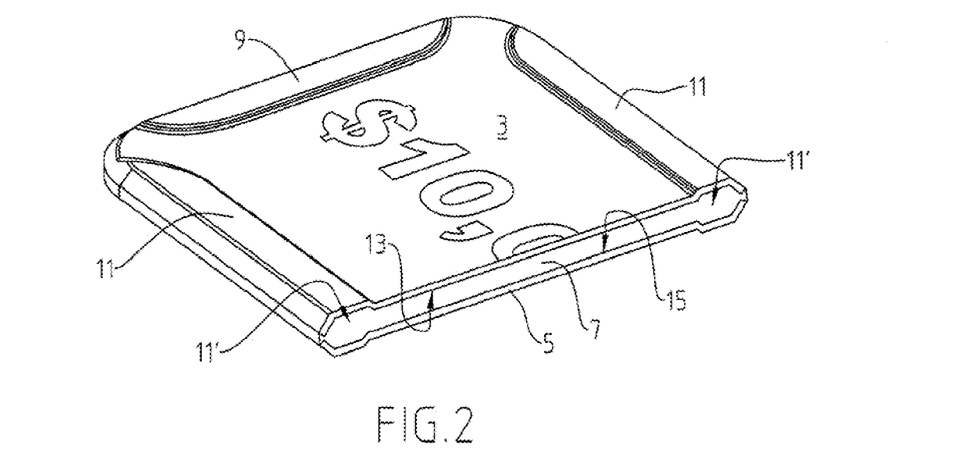
FIG. 2 shows a sectional and a perspective view of the chip shown in FIG. 1.
Figure 3:
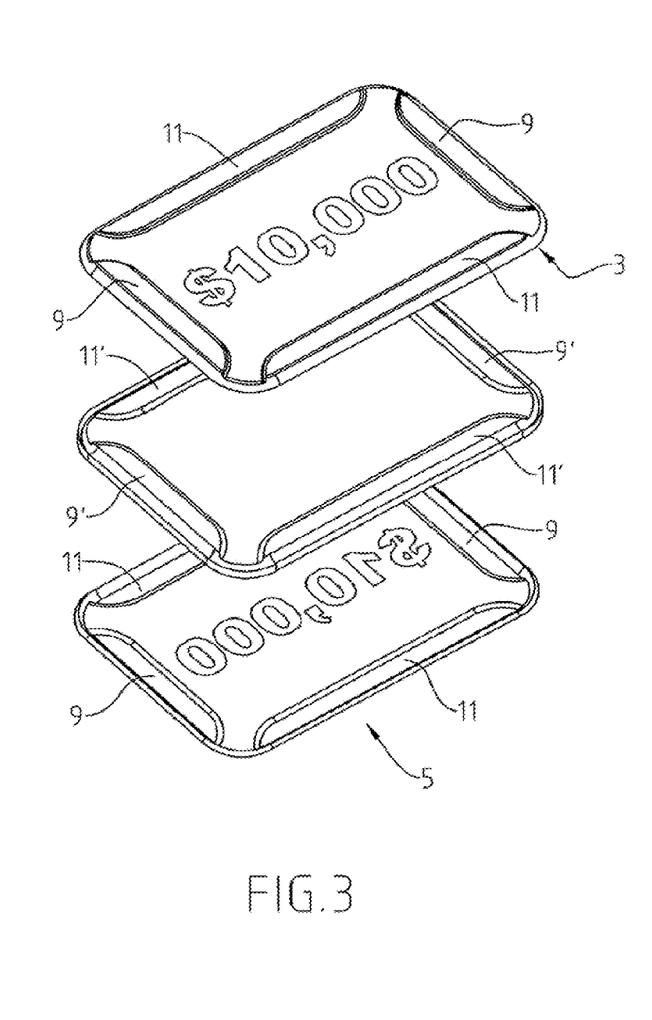
FIG. 3 is an exploded perspective view of the chip shown in FIG. 1.

FIGS. 1 to 3 show a chip according to the invention obtained by the method which will be described below.

FIG. 1 shows a casino chip 1 having, in a plan view, a generally rectangular shape with rounded corners, more commonly referred to as a plaque, preferably displaying a monetary value on each of the faces thereof.

The chip 1 according to the invention has a sandwich construction formed of two plaques 3 and 5, between which a layer of connection material 7 is disposed (FIG. 3).

The plaques 3 and 5 each comprise raised decorations 9 and 11 which extend along the edge thereof, said decorations strengthening the plaques against torsional deformation and enabling the chips to be stacked, whilst simultaneously preventing the chip faces from sticking to one another, thus facilitating the handling of the chips. Since the plaques 3 and 5 have a substantially uniform thickness, the layer of material 7 also has raised portions 9' and 11' resulting from the layer 7 being moulded between the plaques 3 and 5 by injection under pressure.

The raised portions 9' and 11' have shapes which are complementary to those of the inner faces 13 and 15 of the plaques 3 and 5 respectively.

Figure 4:
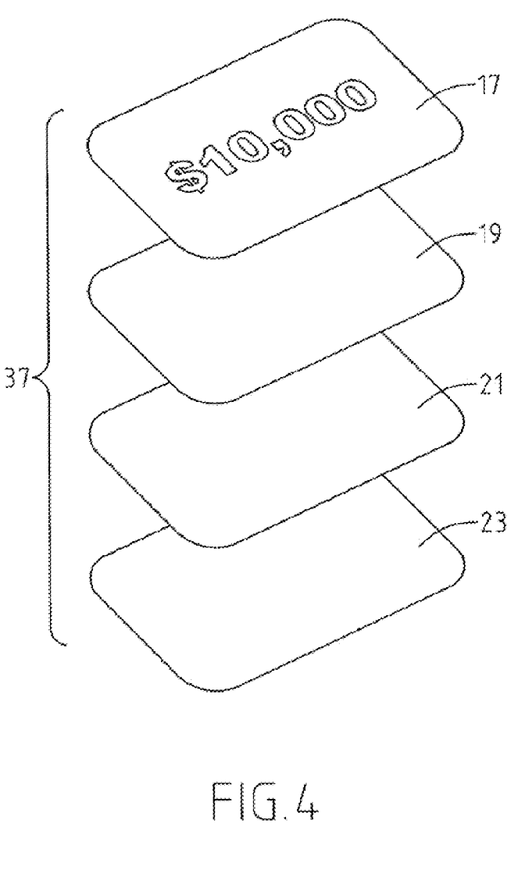
FIG. 4 is an exploded perspective view of a first chip plaque according to the invention before it is arranged in a mould.

Each of the plaques 3 and 5 is a laminate of a plurality of layers of material laid on top of one another to form a decoration, as shown in particular shown in FIG. 4.

This figure shows a plurality of overlaid layers of a laminate which form a blank of one of the plaques 3 or 5.

The plaques 3 and 5 are formed identically in the context of this embodiment.

It should of course be understood that the invention is not limited to the embodiment of a chip with two identical faces, and that it includes chips with different faces.

In the example shown in FIG. 4, the laminate comprises four layers or sheets.

The upper layer or sheet 17, which is the layer which forms the surface of the chip, is made of a transparent material so as to show the decoration produced by the succession of other overlaid layers below.

Decorative markings such as text or numbers which indicate the value assigned to the chip are printed on the lower side of the upper layer 17. The decorative markings are printed on a self-adhesive transparency to provide them with a good level of durability.

The laminate comprises a second layer or sheet 19 which is placed directly below the upper layer 17 and is also transparent to show the decoration of a third layer 21 placed directly underneath.

The layer 19 may or may not be coloured and it serves to provide the decoration with the appearance of depth.

The third layer or sheet 21 may be a layer with a particular decoration or appearance, such as a sandy effect, a glitter effect, etc, on the side remote from the layer 19. The material of the third layer may be coloured or the entire surface of the sheet may be printed, in a four-colour process (image printing) for example.

A lower layer or sheet 23 is a protective layer which may be opaque or transparent and may or may not be coloured. It protects the decoration on the lower side of the sheet 21 during the injection step under pressure, as will be described below.

Each layer should be formed from a material capable of deforming under the effect of an injection of material under pressure into a mould at the temperature and pressure specified.

The layers or sheets may be formed, for example, from cellulose acetate, polycarbonate, methyl polymethacrylate or polyvinyl chloride.

The layers or sheets are connected to one another, by an adhesive for example in order to form a plaque blank.

The method of producing a chip as described above will now be discussed with reference to FIGS. 5 and 6.

Figure 5:
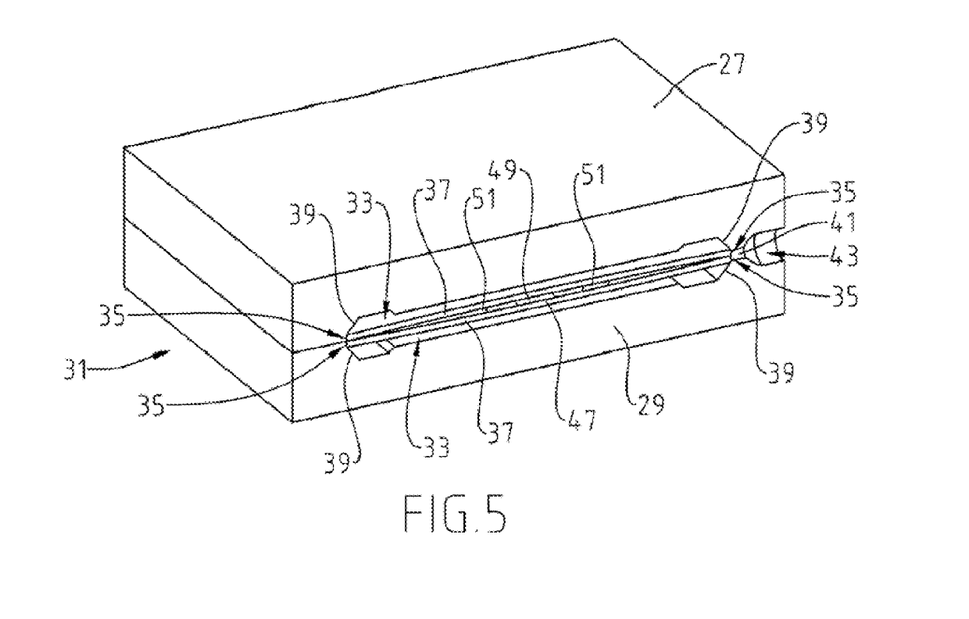
FIG. 5 shows a sectional view and a perspective view of a mould in which two plaques are arranged before the injection step.
Figure 6:
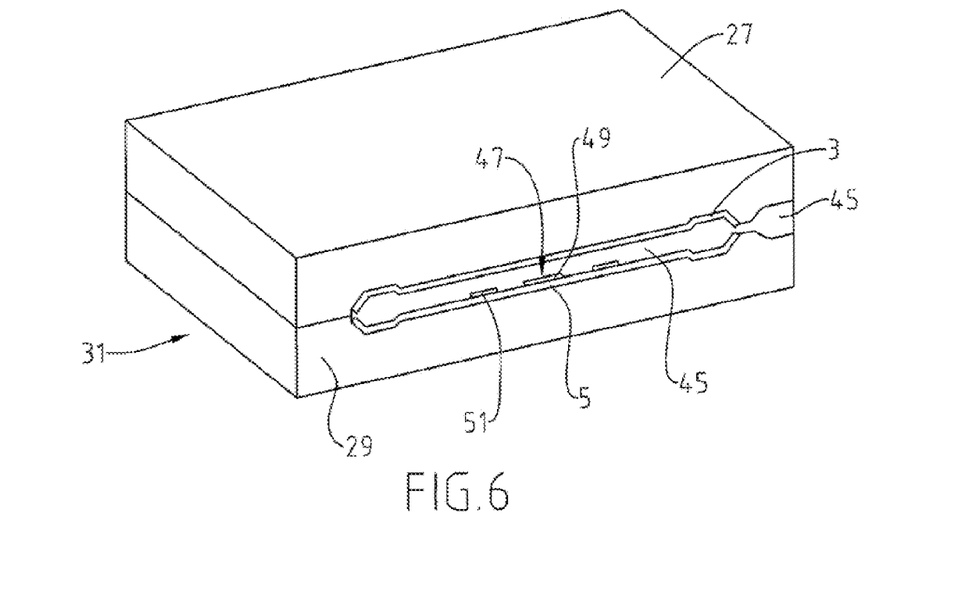
FIG. 6 shows a sectional view and a perspective view of the mould shown in FIG. 5 containing the two plaques after the injection step.

FIGS. 5 and 6 show a mould 25 according to the invention which is used to carry out the method.

The mould 25 comprises two mould halves 27 and 29, each comprising an impression half 33, the shape of which is complementary to that of half of the chip to be desirably obtained.

The mould impression halves 33 each have an internal peripheral recess 35 from the parting plane of the mould halves, the height or depth of said recess corresponding substantially or being slightly smaller than the height of a plaque blank 37.

More specifically, the recess 35 is defined by the wall of each impression half extending perpendicular to the parting plane of the mould halves and between this parting plane and an inclined wall 39 which defines the inclined outer edge of a raised portion adjacent to the edge of the plaque in a finished plaque.

In a first step, the plaque blanks 37 (which correspond to the plaques 3 and 5 before injection and which have been cut to the peripheral dimensions of the recess 35) are arranged in the impression halves 33 of the mould 31 by being placed in the recesses 35.

When the mould is closed, the two blanks 37 are pressed against one another since the depth of the recesses 35 is preferably slightly smaller than the thickness of the blanks 37. Displacement of the blanks in the impressions 33 of the mould 31 is prevented by inclined sides 39 of the impressions which wedge the outer peripheral edge of the plaques in the angle formed between the walls 35 and 39.

The total thickness of the two blanks 37 (or plaques) is smaller than that of the finished chip, which corresponds to the thickness of the impression in the mould.

The mould 31 has an injection point 41, the feed channel 43 of which is formed in the two impression halves 33 as described above.

In this way, the material is injected under pressure into the mould 31 between the two mould halves 27 and 29 and is forced to pass between the two blanks 37, the contours of which follow that of the peripheral recess 35 and which are held with their edges pressed against one another by the mould halves as described above.

The material 45 injected into the mould 31 under pressure is a material which connects the two plaques 3 and 5 to one another.

For example, this material may be cellulose acetate, polycarbonate, methyl polymethacrylate or polyvinyl chloride.

FIG. 6 shows the arrangement of the plaques 3 and 5 obtained in the mould after the material 45 has been injected under pressure.

The material 45 is injected into the mould at a temperature of between 150 and 350° C., a pressure of between 150 and 1,500 bars, for example substantially 1,000 bars, for a predetermined time of approximately 2 seconds.

The injection temperature for cellulose acetate plaques is preferably substantially 200° C.

The injection temperature for polycarbonate plaques is preferably substantially 300° C.

The injection temperature for methyl polymethacrylate plaques is preferably substantially 280° C.

The injection temperature for polyvinyl chloride plaques is preferably substantially 180° C.

The material 45 enters the mould between the two blanks 37, each formed by a laminate of material layers 17, 19, 21 and 23 which are capable of deforming in the mould.

On account of the pressure and temperature at which the material 45 is injected, said material exerts pressure on the blanks 37 which thus deform and are pressed against the back of each of the two impression halves 33 so as to form the plaques 3 and 5.

The plaques 3 and 5 thus follow the shape of the surfaces of the impression halves, and thus form the raised portions 9 and 11 as expected.

The material 45 connects the plaques 3 and 5 thus obtained.

The chip 1 is then removed from the mould and cooled. It leaves the mould having a satisfactory surface finish without any additional operations, such as a cutting operation, being required.

In a final step, the sprue of injected material at the injection point is recycled.

This residue of material may advantageously be subsequently ground and reused as a granular material in order to again form the connection material 45 which can be reinjected under pressure.

The method according to the invention is thus advantageous in terms of cost since, with the exception of the sprue, there is no wastage of material during the injection process.

Furthermore, since the material to be injected is in granular form, the cost thereof is substantially lower (three to four times lower for vinyl acetate) than the cost of the same material in the form of sheets, as used in the conventional production method by stacking layers and then carrying out a thermoforming process.

The chip produced in FIGS. 5 and 6 is a chip which specifically comprises a detection and/or identification device 47.

Figure 7:
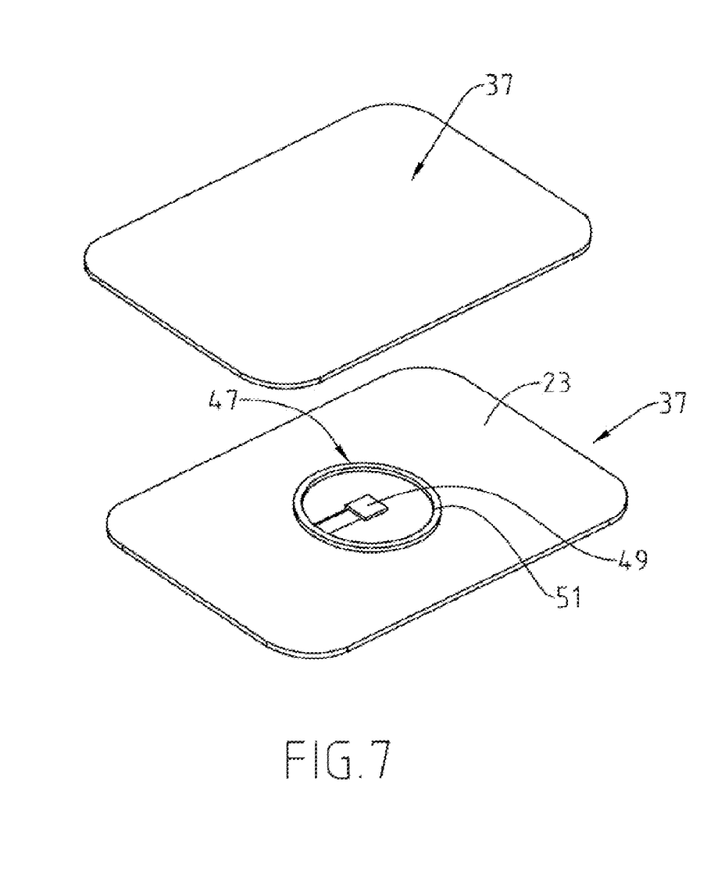
FIG. 7 is a schematic perspective view of two plaques facing one another before they are arranged in a mould, one of the two plaques comprising a detection device according to a first embodiment.

The detection device is an electronic radio frequency device comprising a semiconductor microchip 49 and an antenna 51.

As can be seen in particular in FIG. 7, the device 47 is adhesively bonded to the final layer 23 of a blank 37, in this case the final layer 23 preferably being an opaque decorative film so the detection device is not visible once the chip 1 is completed.

Surprisingly, the injection of material 45 under pressure does not cause the microchip 49 to become detached from the layer 23 despite the temperature and pressure within the mould 31.

In fact, as the impression inside the mould is filled, the blanks are pressed against the back of the impressions, thus limiting the pressure increase within the mould.

Furthermore, the detection device 47 only represents a very slight obstacle to the flow of injected material since the material only encounters the side of the microchip 49, which is very thin.

The detection device 47 which is incorporated in the chip in this way is thus difficult to access and cannot be removed from the chip without destroying it, since it is embedded in the material 45.

Figure 8:
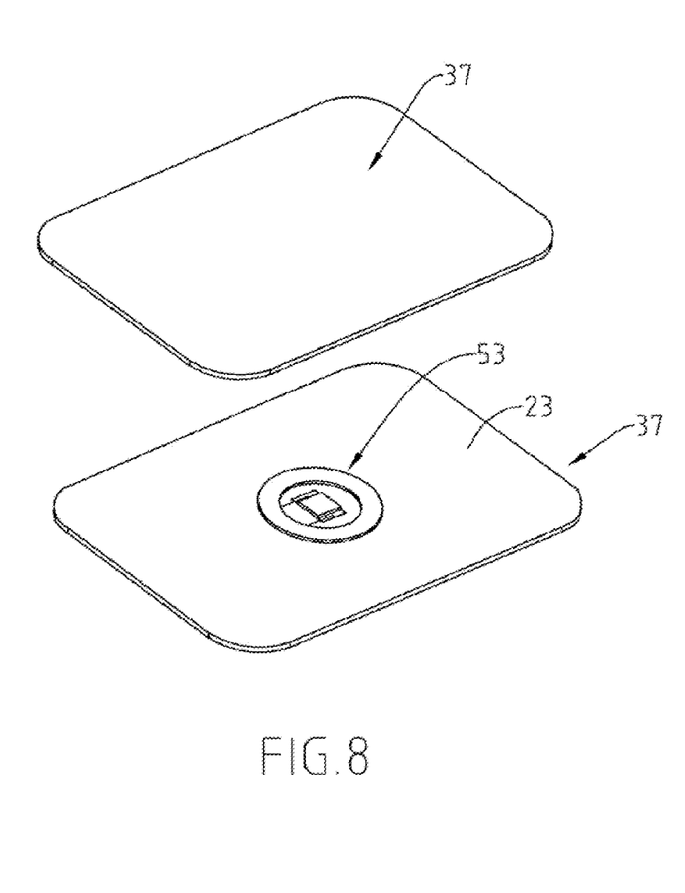
FIG. 8 is a schematic perspective view of two plaques facing one another before they are arranged in a mould, one of the two plaques comprising a detection device according to a second embodiment.
Figure 9:
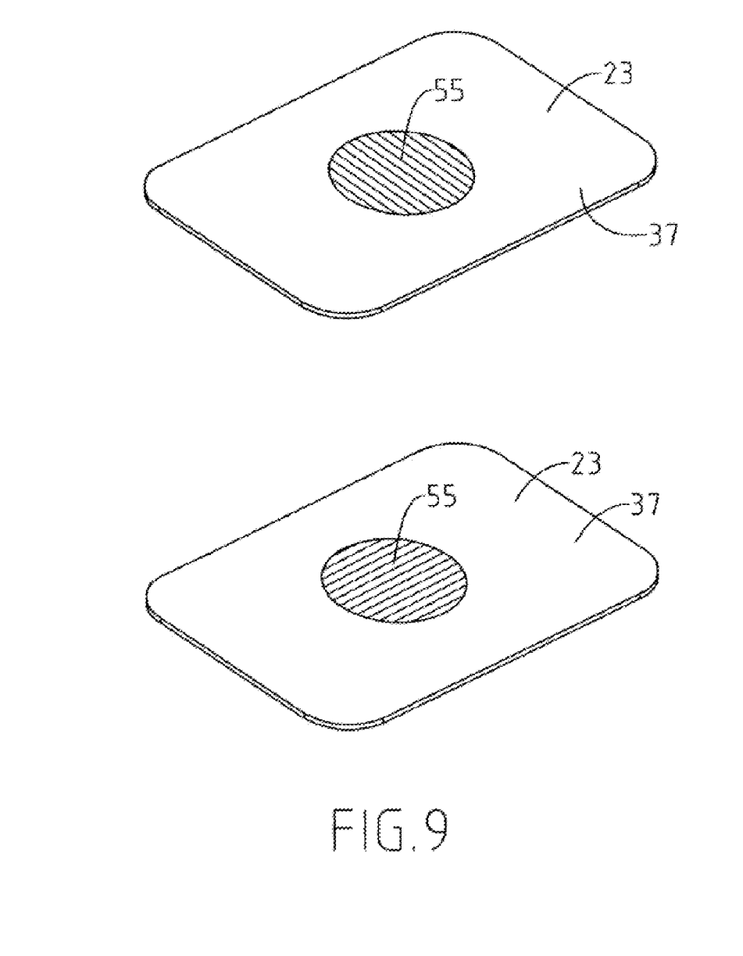
FIG. 9 is a schematic perspective view of two plaques facing one another before they are arranged in a mould, each of the two plaques comprising a detection device according to a third embodiment.
Figure 10:
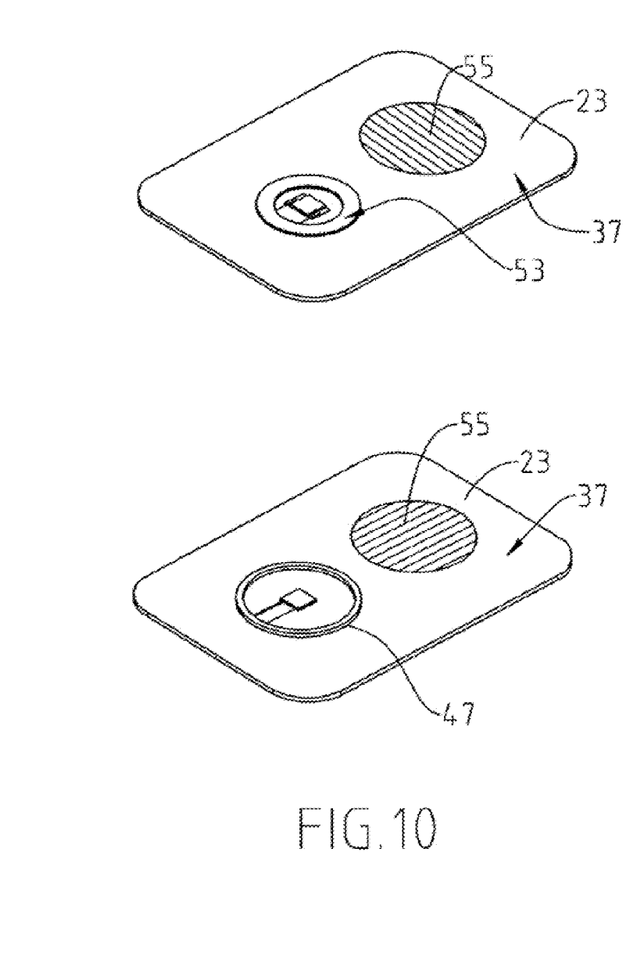
FIG. 10 is a schematic perspective view of two plaques facing one another before they are arranged in a mould, each of the two plaques comprising two detection devices according to a fourth embodiment.

FIGS. 8 to 10 show further embodiments of chips according to the invention comprising one or more other detection and/or identification devices.

Two blanks 37 are shown in FIG. 8.

A radio frequency detection device 53 is adhesively bonded to the lower layer 23 of one of the two blanks 37 before the blanks are arranged in the mould 31.

The device 53 differs from the device 47 in that it detects signals over a different range of frequencies from that of the device 47.

FIG. 9 shows two further blanks with which a chip according to the invention can be obtained.

A detection device 55 has been adhesively bonded to each lower layer of each of the blanks 37.

The detection devices 55 are film-type detection devices which are capable of triggering an alarm when they are located in a given magnetic field.

Devices 55 of this type are commonly used as an anti-theft system for retail premises. They are adhesively bonded to the packaging of products for sale and cause an alarm to sound when the products pass through a walk-through scanner without having previously been demagnetised.

The devices 55 are adhesively bonded to each layer 23 so as to be positioned in perpendicular directions in such a way that the chip is sensitive to magnetic fields irrespective of the position thereof. The chip may thus be arranged in any position underneath a walk-through scanner and will trigger an alarm if the device has not been deactivated.

FIG. 10 shows a further embodiment of the blanks 37 for forming a chip 1 according to the invention.

One of the lower layers 23 of the blank 37 comprises a radio frequency-type detection device 53 and a film-type detection device 55, whilst the other lower layer comprises a radiofrequency device 47 and a film-type detection device 55 positioned perpendicular to that of the other layer 23. A chip of this type thus enables detection in two different frequency ranges, and via a magnetic field to be achieved.

The preceding description described how the invention allows chips to be produced more efficiently, simply and more cost-effectively than the methods of the prior art.

In particular, the chips obtained by the method according to the invention have completely uniform thicknesses. In fact, the variation in thickness of the decorations (on account of a plurality of sheets being laid one on top of another) does not affect the thickness of the finished product, which is determined by the impression of the mould.

It should, however, be understood that the invention is not limited to the embodiments which have specifically been described above, but includes the use of any equivalent means.

It should be understood in particular that the shape of the chips or the impression halves in the mould do not restrict the invention in any way.

The invention claimed is:

1. A method of using a mould to manufacture a finished plaque comprising:
   providing said mould having a first and second half, each half having an impression with a shape complementary to that of the exterior of the finished plaque to be produced, each half having an internal peripheral recess defined by a wall of each impression half extending perpendicular to the parting plane of the respective mould half, said mould further having an inclined wall that defines an inclined outer edge of the finished plaque, the internal peripheral recess located between the parting plane and the inclined wall;
   arranging in said mould two plaque blanks of said finished plaques which are placed against one another with the faces thereof facing one another, the total thickness of said blanks being smaller than that of the finished plaque, an end of each plaque blank contacting the corresponding internal peripheral recess of the respective mould half;
   holding the periphery of said plaque blanks within said mould;
   injecting a connection material under pressure between said facing faces of said two plaque blanks at a pressure and temperature suitable for deforming said plaque blanks against the surface of the impression of the mould and causing the end of each blank plaque to break contact with the internal peripheral recess, creating space for the connection material to be filled;
   deforming said plaque blanks against the impression of the mould such that said connection material is confined to an area between said facing faces of said two plaque blanks and the plaque blanks deform and wedge against the inclined wall to form the outer edge in the finished plaque; and
   removing the finished plaque thus obtained from the mould after a predetermined injection moulding time and cooling said finished plaque.

2. Method according to claim 1, wherein a detection and/or identification device is fixed to one of said facing faces of at least one of said two plaque blanks before the step of arranging said blanks in the mould.

3. Method according to claim 1, wherein said injection temperature is substantially between 180° C. and 350° C.

4. Method according to claim 1, wherein the injection pressure is between 500 and 1,500 bars.

5. Method according to claim 1, wherein said two plaque blanks are formed before they are arranged in the mould, the two blanks having substantially planar opposite faces.

6. A method of using a mould to manufacture a finished plaque comprising:
   providing said a mould having an impression with a shape complementary to that of the exterior of the finished plaque to be produced, said mould having a first and second impression half, wherein each said impression half comprises, in the immediate vicinity of the edge thereof, an internal peripheral recess perpendicular to the parting plane of said impression half, the depth of which corresponds to, or is less than, the height of a plaque blank, said recess being adjacent to an inclined wall of said impression, said inclined wall defining the inclined outer edge of a raised portion of the finished plaque, two plaque blanks are pressed together at said internal peripheral recess when placed within said first and second impression half respectively, a connection material is forced into an area between said two plaque blanks and is confined to said area, and said two plaque blanks deform against the surface of the first and second impression half respectively;
   arranging in a mould two plaque blanks of said finished plaques which are placed against one another with the faces thereof facing one another, the total thickness of said blanks being smaller than that of the finished plaque, an end of each plaque blank contacting the corresponding internal peripheral recess of the respective mould half;
   holding the periphery of said plaque blanks within said mould;
   injecting said connection material under pressure between said facing faces of said two plaque blanks at a pressure and temperature suitable for deforming said plaque blanks against the surface of the impression of the mould and causing the end of each blank plaque to break contact with the internal peripheral recess, creating space for the connection material to be filled;
   deforming said plaque blanks against the impression of the mould such that said connection material is confined to an area between said facing faces of said two plaque blanks and the plaque blanks deform and wedge against the inclined wall to form the outer edge in the finished plaque; and removing the finished plaque thus obtained from the mould after a predetermined injection moulding time and cooling said finished plaque.

7. Method according to claim 6, wherein a detection and/or indemnification device is fixed to one of said facing faces of at least one of said two plaque blanks before the step of arranging said blanks in the mould.

8. Method according to claim 6, wherein said injection temperature is substantially between 180° C. and 350° C.

9. Method according to claim 6, wherein the injection pressure is between 500 and 1,500 bars.

10. Method according to claim 6, wherein said two plaque blanks are formed before they are arranged in the mould, the two blanks having substantially planar opposite faces.

11. A method of using a mould to manufacture a finished plaque comprising:
 providing said a mould having an impression with a shape complementary to that of the exterior of the finished plaque to be produced, said mould having a first and second impression half, wherein each said impression half comprises, in the immediate vicinity of the edge thereof, an internal peripheral recess perpendicular to the parting plane of said impression half, the depth of which corresponds to, or is less than, the height of a plaque blank, said recess being adjacent to an inclined wall of said impression, said inclined wall defining the inclined outer edge of a raised portion of the finished plaque;
 arranging in a mould two plaque blanks of said finished plaques which are placed against one another with the faces thereof facing one another, the total thickness of said blanks being smaller than that of the finished plaque, an end of each plaque blank contacting the corresponding internal peripheral recess of the respective mould half;
 holding the periphery of said plaque blanks within said mould;
 injecting said connection material under pressure between said facing faces of said two plaque blanks at a pressure and temperature suitable for deforming said plaque blanks against the surface of the impression of the mould and causing the end of each blank plaque to break contact with the internal peripheral recess, creating space for the connection material to be filled;
 deforming said plaque blanks against the impression of the mould such that said connection material is confined to an area between said facing faces of said two plaque blanks and the plaque blanks deform and wedge against the inclined wall to form the outer edge in the finished plaque; and
 removing the finished plaque thus obtained from the mould after a predetermined injection moulding time and cooling said finished plaque.

12. Method according to claim 11, wherein a detection and/or indemnification device is fixed to one of said facing faces of at least one of said two plaque blanks before the step of arranging said blanks in the mould.

13. Method according to claim 11, wherein said injection temperature is substantially between 180° C. and 350° C.

14. Method according to claim 11, wherein the injection pressure is between 500 and 1,500 bars.

15. Method according to claim 11, wherein said two plaque blanks are formed before they are arranged in the mould, the two blanks having substantially planar opposite faces.

* * * * *